(12) United States Patent
Brüll et al.

(10) Patent No.: US 10,787,088 B2
(45) Date of Patent: Sep. 29, 2020

(54) VEHICLE ELECTRICAL SYSTEM WITH INVERTER, ENERGY STORE, ELECTRICAL MACHINE AND DC TRANSMISSION TERMINAL

(71) Applicant: Continental Automotive GmbH, Hannover (DE)

(72) Inventors: Martin Brüll, Barbing (DE); Martin Ehrmann, Nuremberg (DE); Hans-Peter Feustel, Roth (DE); Franz Pfeilschifter, Regensburg (DE); Matthias Töns, Regensburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 119 days.

(21) Appl. No.: 16/307,312

(22) PCT Filed: May 31, 2017

(86) PCT No.: PCT/EP2017/063227
§ 371 (c)(1),
(2) Date: Dec. 5, 2018

(87) PCT Pub. No.: WO2017/211657
PCT Pub. Date: Dec. 14, 2017

(65) Prior Publication Data
US 2019/0135132 A1 May 9, 2019

(30) Foreign Application Priority Data
Jun. 6, 2016 (EP) .......................... 10 2016 209 898

(51) Int. Cl.
*B60L 53/22* (2019.01)
*B60L 15/00* (2006.01)
(Continued)

(52) U.S. Cl.
CPC ............ *B60L 53/22* (2019.02); *B60L 15/007* (2013.01); *B60L 50/51* (2019.02); *B60L 53/11* (2019.02);
(Continued)

(58) Field of Classification Search
CPC ...... B60L 53/22; B60L 53/24; B60L 2210/40; B60L 53/11; B60L 53/14; B60L 53/51; B60L 22/103
(Continued)

(56) References Cited

U.S. PATENT DOCUMENTS

| 5,504,414 A | 4/1996 | Kinoshita |
| 7,088,595 B2 | 8/2006 | Nino |

(Continued)

FOREIGN PATENT DOCUMENTS

| DE | 102005014758 A1 | 10/2005 |
| DE | 102008063465 A1 | 6/2010 |

(Continued)

OTHER PUBLICATIONS

International Search Report and Written Opinion for International Application No. PCT/EP2017/063227, dated Aug. 28, 2017—12 pages.

(Continued)

*Primary Examiner* — Paul Dinh
(74) *Attorney, Agent, or Firm* — RatnerPrestia

(57) ABSTRACT

The vehicle electrical system described includes an inverter, an electrical energy store, an electrical machine and a DC transmission terminal. The inverter is connected to the energy store via input current terminals. At least two phase current terminals of the inverter are connected to the electrical machine. The inverter has at least two H-bridges. The DC transmission terminal has a positive rail connected to at least one of the phase current terminals.

12 Claims, 3 Drawing Sheets

(51) Int. Cl.
    *B60L 50/51*     (2019.01)
    *B60L 53/24*     (2019.01)
    *H02M 3/158*     (2006.01)
    *H02J 1/08*     (2006.01)
    *B60L 53/10*     (2019.01)
    *B60L 53/14*     (2019.01)
    *B60L 53/122*     (2019.01)
    *H02M 7/537*     (2006.01)
    *H02J 7/02*     (2016.01)

(52) U.S. Cl.
    CPC ............ B60L 53/122 (2019.02); B60L 53/14 (2019.02); B60L 53/24 (2019.02); H02J 1/08 (2013.01); H02M 3/1582 (2013.01); *B60L 2210/12* (2013.01); *B60L 2210/14* (2013.01); *B60L 2210/30* (2013.01); *B60L 2210/40* (2013.01); *B60L 2220/54* (2013.01); *H02J 7/022* (2013.01); *H02M 7/537* (2013.01); *Y02T 10/641* (2013.01); *Y02T 10/7005* (2013.01); *Y02T 10/7072* (2013.01); *Y02T 10/7225* (2013.01); *Y02T 10/7233* (2013.01); *Y02T 10/7241* (2013.01); *Y02T 10/92* (2013.01); *Y02T 90/121* (2013.01); *Y02T 90/122* (2013.01); *Y02T 90/127* (2013.01); *Y02T 90/128* (2013.01); *Y02T 90/14* (2013.01)

(58) Field of Classification Search
    USPC ........................................................ 320/104
    See application file for complete search history.

(56) References Cited

U.S. PATENT DOCUMENTS

| | | | |
|---|---|---|---|
| 2005/0127853 A1* | 6/2005 | Su | .................... H02M 7/487 318/108 |
| 2009/0219001 A1 | 9/2009 | Kimura | |
| 2011/0248563 A1 | 10/2011 | Komma et al. | |
| 2011/0316461 A1 | 12/2011 | Rippel | |
| 2014/0042807 A1* | 2/2014 | Bouchez | ................. B60L 53/22 307/10.1 |
| 2014/0340039 A1 | 11/2014 | Lee et al. | |
| 2014/0368131 A1 | 12/2014 | Katsumata et al. | |
| 2015/0343911 A1* | 12/2015 | White | ................. H02M 7/5387 290/16 |
| 2015/0375629 A1 | 12/2015 | De Sousa et al. | |

FOREIGN PATENT DOCUMENTS

| | | |
|---|---|---|
| DE | 102013224511 A1 | 6/2015 |
| EP | 0849112 A1 | 6/1998 |
| EP | 2500211 A2 | 9/2012 |
| JP | 5961402 A | 4/1984 |
| JP | 2002165370 A | 6/2002 |
| JP | 2011130571 A | 6/2011 |
| JP | 2011188601 A | 9/2011 |
| JP | 2012110121 A | 6/2012 |
| WO | 2010130607 A2 | 11/2010 |
| WO | 2011063006 A1 | 5/2011 |
| WO | 2015193003 A1 | 12/2015 |

OTHER PUBLICATIONS

German Examination Report for German Application No. 10 2016 209 898.5, dated Feb. 13, 2017—7 pages.
German Examination Report for German Application No. 10 2016 209 872.1, dated Feb. 9, 2017—6 pages.
International Search Report and Written Opinion for International Application No. PCT/EP2017/063222, dated Aug. 11, 2017—7 pages.
European Communication pursuant to Article 94(3) for European Application No. 17 729 055.8, dated Apr. 29, 2020, 6 pages.

* cited by examiner

US 10,787,088 B2

VEHICLE ELECTRICAL SYSTEM WITH INVERTER, ENERGY STORE, ELECTRICAL MACHINE AND DC TRANSMISSION TERMINAL

CROSS REFERENCE TO RELATED APPLICATIONS

This application is the U.S. National Phase Application of PCT International Application No. PCT/EP2017/063227, filed May 31, 2017, which claims priority to European Patent Application No. 10 2016 209 898.5, filed Jun. 6, 2016, the contents of such applications being incorporated by reference herein.

BACKGROUND OF THE INVENTION

Motor vehicles having an electrical drive, i.e. electric vehicles and hybrid vehicles, comprise an electrical energy store for supplying power to the electrical drive. Electric vehicles and plug-in hybrids are equipped with a terminal by means of which power can be transmitted from a stationary electrical supply system (local or public) to the energy store for the purpose of charging the latter. If need be, the vehicles are also equipped to feed electric power back to the supply system.

Transmitting electric power between supply system and vehicle requires power electronics components, in particular for controlling the transmission of power.

SUMMARY OF THE INVENTION

An aspect of the invention aims to demonstrate a possibility that enables the complexity of such components to be reduced.

There is provision for the transmission of a DC current to or from the vehicle electrical system (of a motor vehicle as described at the outset) to involve the use of components of an inverter. To this end, at least one rail of a DC transmission terminal (for example a plug-in connection or a vehicle-based apparatus for inductive power transmission) is connected to at least one phase current terminal of the inverter. The at least one rail is connected to at least one input current terminal directly, or is connected to at least one input current terminal via an electrical machine (of the electrical drive of the vehicle) connected to phase current terminals. The connection between DC transmission terminal and (at least one) phase current terminal may therefore be provided directly or indirectly via the electrical machine.

As a result, an additional step-up or step-down converter matching the voltage at the DC transmission terminal to the voltage at the energy store is not required. The power electronics already present in the form of the inverter, which in particular provides the phase currents for the electrical machine, is also used in this instance for controlling the power (in particular the current and/or the voltage) transmitted via the DC transmission terminal.

The inverter further comprises H-bridge circuits. These are connected between the electrical energy store and the phase current terminals. This allows operation of the inverter to convert between the DC voltage of the energy store and the phase voltages of the phase terminals (i.e. of the electrical machine). This further allows conversion between the DC voltage at the DC transmission terminal and the DC voltage of the energy store.

A control unit may be provided that actuates the inverter. The control unit is connected to the inverter for the purposes of actuation. In an inversion mode of the control unit, the inverter is actuated to produce phase voltages present at the phase terminals from the DC voltage of the energy store. In an (optional) recovery mode, the control unit actuates the inverter to produce a charging voltage at the energy store from the phase voltages at the phase terminals. In a charging mode, the control unit actuates the inverter to produce a charging voltage at the energy store from the voltage present at the DC transmission terminal. In an (optional) feedback mode, the control unit actuates the inverter to produce a feedback voltage at the DC transmission terminal from the voltage present at the energy store of the vehicle electrical system. The charging voltage at the energy store can be prescribed by a battery management system of the energy store or by a recovery controller as a setpoint value. Instead of a charging voltage, it is also possible for a charging current or a charging power to be prescribed as the setpoint value. The phase voltages can be prescribed by a (superordinate) motor controller of the electrical machine, either directly as a voltage setpoint value or as a power or torque requirement. Instead of phase voltages, it is also possible for phase currents, as mentioned, to be used for control. The feedback voltage can be detected as a setpoint value by a reception device of the vehicle electrical system. The reception device may be configured to receive setpoint values from a stationary controller. Instead of a feedback voltage, it is also possible for a feedback current or a feedback power to be prescribed.

As mentioned, the vehicle electrical system described here is equipped with an inverter, an electrical energy store, an electrical machine and a DC transmission terminal. The inverter comprises semiconductor circuit breakers. The topology of the inverter and the connection thereof within the on-board electrical system is depicted below. The electrical energy store is in particular a storage battery, for example a lithium-based storage battery. The electrical energy store may be a traction storage battery. The energy store can have a rated voltage of 40-60 V, in particular of 48 V, and can in particular have a rated voltage of more than 100 volts, in particular of at least 200 or 300 V, for example of 350-420 V. The energy store may therefore be a high-voltage storage battery. The electrical machine is in particular a three-phase machine. The electrical machine may be a separately excited or permanent-magnet electrical machine. The DC transmission terminal can comprise a plug-in inlet, i.e. an electromechanical plug connection element that can be fitted in the outer skin of a vehicle. The DC transmission terminal is configured to be connected to a charging plug (or more generally: connector).

The inverter has a positive input current terminal and a negative input current terminal. The term input current terminal is obtained from the inverter mode in which the inverter receives power from the energy store. In this mode, the inverter receives power via the input current terminal, which means that in this mode this terminal is used as the input of the inverter. In the charging mode, the same terminals are used for delivering power to the energy store, i.e. as the output of the inverter.

The input current terminals are connected to the energy store. An intermediate circuit capacitor may be connected in parallel with the energy store or in parallel with the input terminals of the inverter.

The inverter has at least two phase current terminals connected to the electrical machine. In particular, the inverter has phase current terminals in a number corresponding to the number of phases of the electrical machine. Each of the phase current terminals may be connected to a separate phase of the electrical machine. By way of example, the inverter has three (or six) phase current terminals, each connected to one of three (or six) phases of the electrical machine.

The inverter has at least two H-bridges. The H-bridges are each connected between the input current terminals and the phase current terminals. The H-bridges are connected in series between the input current terminals and the phase current terminals. The H-bridges are connected in parallel with one another (at least in respect of the input current terminals). The H-bridges are individually connected to individual phases of the electrical machine.

Each H-bridge comprises two arms. A first of these arms connects the two input current terminals. A second of these arms connects an input current terminal (in particular the negative input current terminal) and a phase current terminal. Each arm comprises two switching elements connected to one another via a connecting point. The two connecting points of each H-bridge (i.e. the connecting point of one arm and the connecting point of the other arm of the same H-bridge) are connected to one another via an inductance.

The switching elements, in particular semiconductor switches, of each arm are connected to one another at connecting points. The two connecting points of each H-bridge are connected to one another by means of an inductance. The inductance is in particular configured as a discrete component, for example as a coil having a core.

As mentioned, the H-bridges of the inverter can each have two arms. These connect the positive input current terminal to the negative input current terminal by means of two series semiconductor switches. The semiconductor switches are preferably transistors, in particular field-effect or bipolar transistors, for example MOSFETs or IGBTs.

Each phase current terminal may be connected to an input current terminal (in particular to the negative input current terminal) via a capacitor. In other words, each H-bridge can have a capacitor connected in parallel with the second arm.

There is provision for the DC transmission terminal to have a positive rail connected to at least one of the phase current terminals. This connection can be used to supply power to the electrical energy store via the inverter. In other words, the DC transmission terminal is connected to at least one of the phase current terminals. In particular, the connection between DC transmission terminal and (at least one) phase current terminal (i.e. the connection between DC transmission terminal and inverter) does not comprise a voltage or current transformer. The connection between DC transmission terminal and (at least one) phase current terminal can have a filter and/or safety elements such as a fuse and/or an isolator switch. The DC transmission terminal can have a contact for a negative potential and a contact for a positive potential. The positive rail can correspond to the positive contact. The negative rail can correspond to the negative contact. The voltage at the DC transmission terminal is the potential difference between these potentials or contacts.

The positive rail of the DC transmission terminal may be connected to at least one of the phase current terminals, preferably in a direct manner. The positive rail of the DC transmission terminal may further be connected to at least one of the phase current terminals (PS1, PS2, PS3) via the electrical machine (EM), i.e. in an indirect manner. "Connected directly" thus denotes a connection that comprises no electrical machine or no windings of an electrical machine. "Connected directly" thus denotes a connection that has no circuit for voltage or current transformation. "Connected directly" can denote a connection that has a filter and/or safety elements such as a fuse and/or an isolator switch. "Connected indirectly" can denote a connection that comprises an electrical machine or a winding of an electrical machine (for example in a series circuit).

The positive rail may be connected to one of the phase current terminals directly. As mentioned, the DC transmission terminal can have a negative rail. This may be connected to another of the phase current terminals. In particular, the phase current terminals may be connected to the electrical machine via a (polyphase) isolator switch. The positive rail and the negative rail of the DC transmission terminal may thus be connected to different phase terminals or different phases of the electrical machine. In order to avoid a flow of current through the electrical machine during the charging mode, an isolator switch may be provided that isolates the phase terminals from the electrical machine or the windings thereof.

Further, there may be an isolator switch provided between phase windings of the electrical machine (in connections between the phase windings itself). Such an isolator switch may be configured to defeat a star interconnection (or delta interconnection) at least in part. The isolator switch may be provided as a switch that disconnects at least one of the phase windings connected to the DC transmission terminal from other phase windings. The switch may further be provided to disconnect all the phase windings from a star point of the electrical machine. The control unit may be configured to actuate the isolator switch. The control unit may in particular be configured to keep the isolator switch in the charging mode or in the feedback mode in the open state. The control unit may further be configured to keep the isolator switch in the inverter mode or in the recovery mode in the closed state. The control unit may further be configured so as, in the event of a fault, to break all the bridges of the inverter, for example if a charging fault or a feedback fault occurs and charging or feedback is intended to be interrupted.

A detent may be provided in order to stop the electric machine (i.e. in order to prevent rotation). The control unit may be configured to actuate the detent. The control unit may in particular be configured to stop the detent in the charging mode and if need be in the feedback mode and not to stop the detent in the inverter mode and if need be in the recovery mode.

Additionally, it is possible for the positive rail to be connected to multiple or preferably all phase current terminals directly or via a switch. In other words, the DC transmission terminal is connected to the phase current terminals, preferably all of them, directly or via a switch. As a result, multiple or all H-bridges can be used in the charging mode or in the feedback mode. The DC transmission terminal has a negative rail connected to the negative input current terminal of the inverter. If a switch is used, then it preferably has multiple phases. The switch has a switch element or a phase for each connection between a phase terminal and the positive rail (in the case of a polyphase switch). The control unit is configured to keep the switch in an open state in the inverter mode or if need be in the recovery mode. The control unit is further configured to keep the switch in a closed state in the charging mode or if need be in the feedback mode. Instead of connecting the positive rail to the phase terminals of the inverter, as described above, the positive rail may also be connected to the phase terminals of the inverter via the electrical machine or via the phase windings thereof. In other words, the positive rail may be connected to the phase current terminals indirectly via the electrical machine. In this instance, the phase windings are connected in series between the positive rail and the inverter. The negative rail of the DC transmission terminal may be connected to the negative input current terminal of the inverter.

There may be provision for the electrical machine to have a star point. The positive rail may be connected to the phase current terminals (of the inverter) via the star point.

As mentioned, the term "positive rail" (referenced to the DC transmission terminal) can preferably be replaced with "positive contact" in all the variants described here and the term "negative rail" can be replaced with "negative contact".

The vehicle electrical system can further have an AC transmission terminal. This may be connected to at least one of the phase current terminals. The AC transmission terminal has in particular multiple phases, for example three phases. Further, the inverter can have three phases, i.e. can have three H-bridges. The phases of the AC transmission terminal are connected to the phase terminals of the inverter.

The vehicle electrical system is in particular the on-board electrical system of a plug-in hybrid motor vehicle or of an electric motor vehicle.

DETAILED DESCRIPTION OF THE PREFERRED EMBODIMENTS

Figure 1:
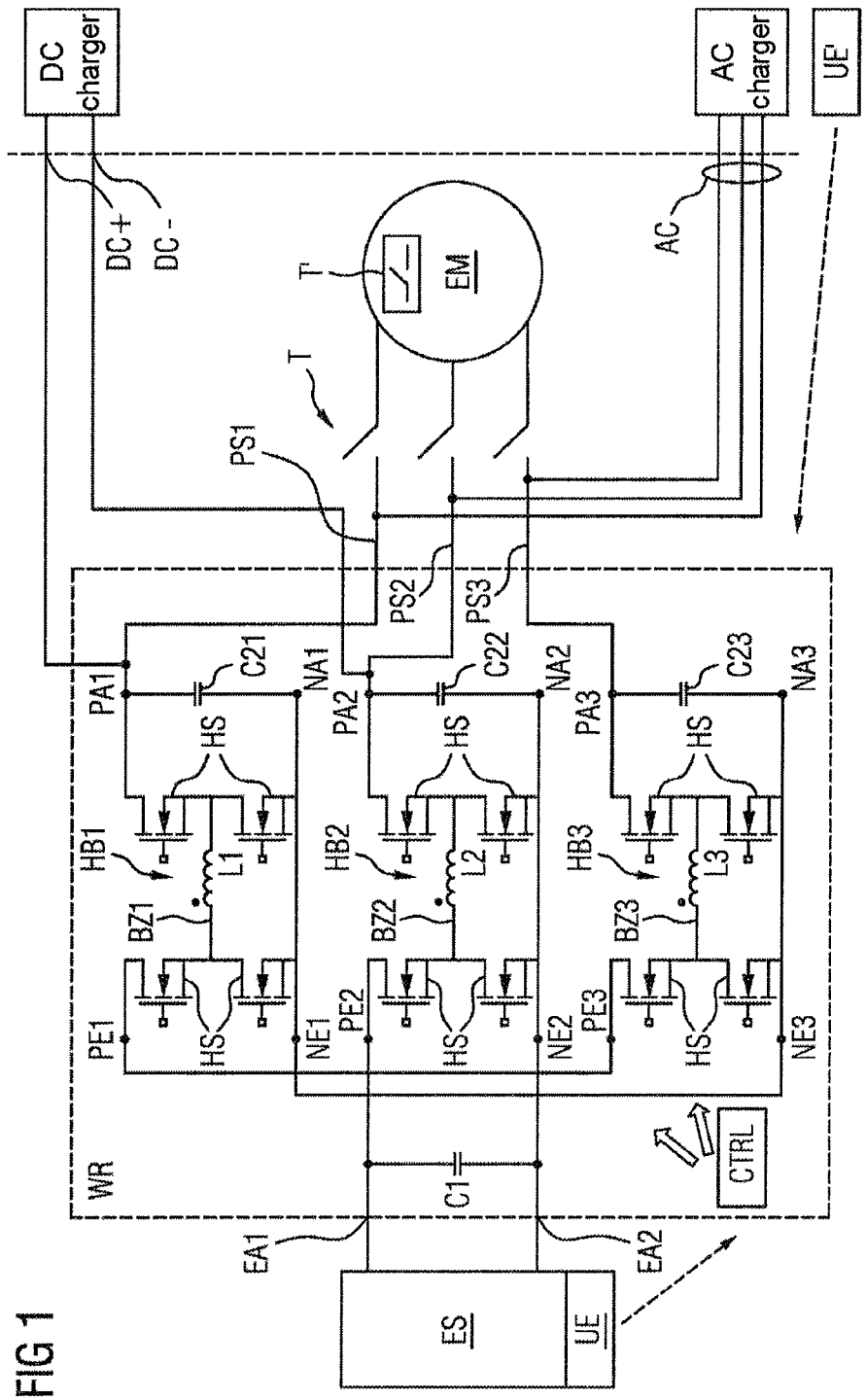
FIGS. 1-3 serve to explain the on-board electrical system described here in more detail and show exemplary vehicle electrical systems.
Figure 2:
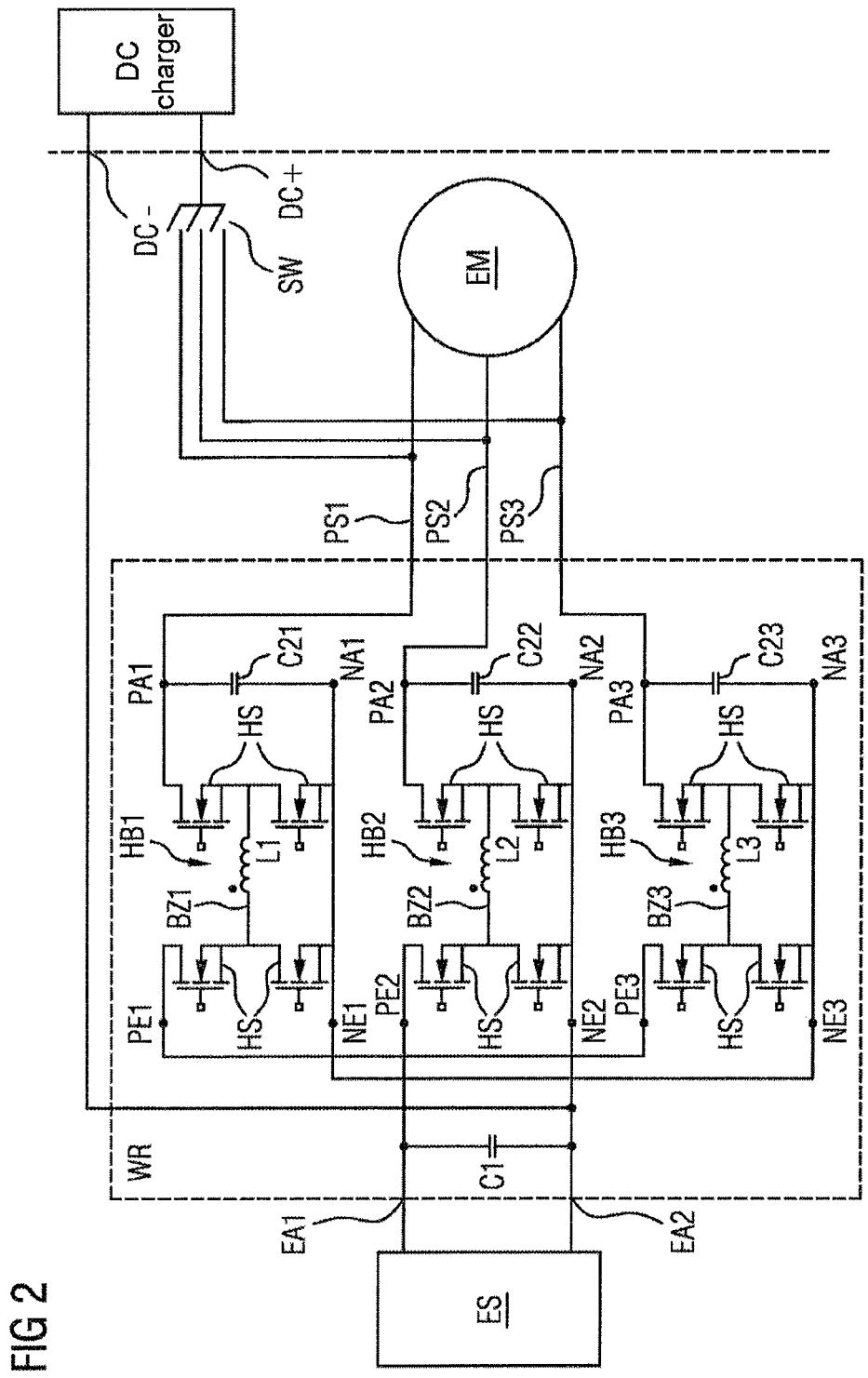
Figure 3:
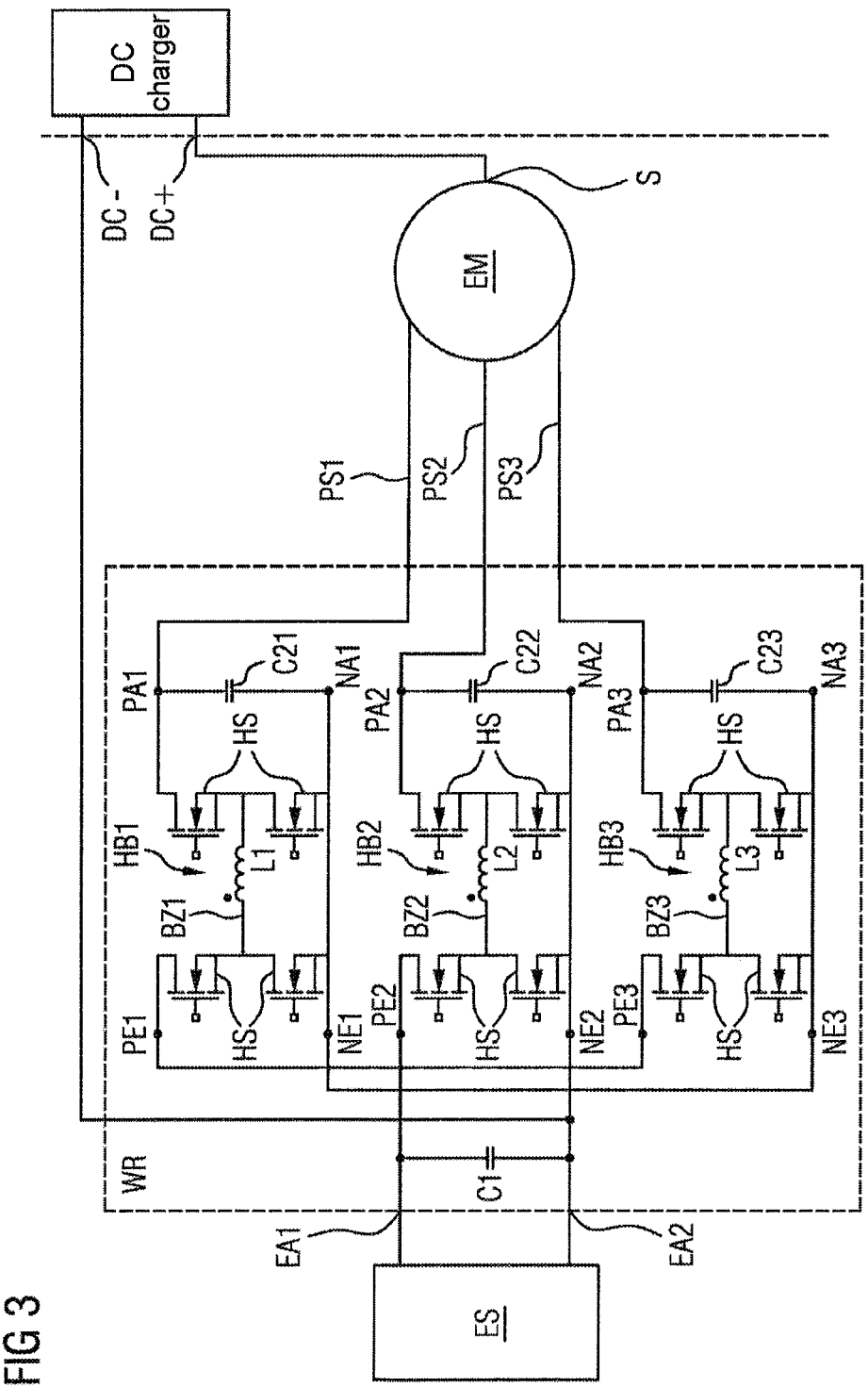

FIGS. 1, 2 and 3 each show a vehicle electrical system having an energy store ES and an electrical machine EM connected to one another via an inverter WR. A DC transmission terminal (in FIG. 1 connected to a "DC charger" outside the vehicle electrical system) has a positive rail DC+ and a negative rail DC−.

In FIGS. 1, 2 and 3, the energy store ES is connected to the inverter WR via a positive input current terminal EA1 and a negative input current terminal EA2 thereof. Connected in parallel with the input current terminals EA1, EA2 is an intermediate circuit capacitor C1. The inverter WR comprises three H-bridges HB1-HB3. The H-bridge HB1 has a positive input PE1 and a negative input NE1. The H-bridge HB2 has a positive input PE2 and a negative input NE2. The H-bridge HB3 has a positive input PE3 and a negative input NE3. The positive inputs PE1-3 are connected to one another and further connected to the positive input terminal EA1 of the inverter WR. The negative inputs NE1-3 are connected to one another and further connected to the negative input terminal EA2 of the inverter WR. Each H-bridge HB1-3 has two arms, each having two series-connected semiconductor switches HS. A first of the arms of each H-bridge (depicted on the left) connects the respective negative input and positive input of the respective H-bridge HB1-3. Each H-bridge has a negative output NA1-3 and a positive output PA1-PA3. In each H-bridge, a second of the arms connects the outputs PA1, NA1; PA2, NA2 and PA3, NA3. Each arm has two semiconductor switches HS connected to one another in series via a connecting point. For each H-bridge HB1-3, it holds that the connecting points of the two arms are connected to one another by means of a bridge path BZ1-3. The bridge path BZ1-3 connecting the connecting points of the two arms in each H-bridge HB1-3 has a series-connected inductance L1-3. In other words, the inductance L1-3 connects the connecting points of the semiconductor switches HS of the two arms in each of the H-bridges HB1-3. Each phase terminal is connected to the negative input current terminal EA2 and to the negative inputs NE1-3 of the H-bridges HB1-3 via a capacitor C21-23. The positive outputs PA1-PA3 of the H-bridges HB1-HB3 correspond to phase current terminals of the inverter WR. For this reason, the positive outputs PA1-PA3 of the H-bridges HB1-3 and the phase current terminals PS1-3 of the inverter WR can be regarded as equivalent to one another. A dashed line depicts the interface between vehicle electrical system and stationary devices (DC charger and AC charger). At this interface, there are the DC transmission terminal and possibly the AC transmission terminal. Depicted to the left of the dashed line is the vehicle electrical system described here.

Now that common aspects of FIGS. 1-3 have been mentioned, principal differences between FIGS. 1-3 are discussed subsequently: in the circuit in FIG. 1, the positive potential of the DC transmission terminal is supplied via one phase terminal of the inverter and the negative potential is supplied via another phase terminal of the inverter. In the circuit in FIG. 2, the positive potential of the DC transmission terminal is supplied (directly) via multiple or all phase terminals of the inverter and the negative potential is supplied via a negative input current terminal of the inverter. In the circuit in FIG. 3, the positive potential of the DC transmission terminal is supplied indirectly via the electrical machine, or the star point thereof, to multiple or all phase terminals of the inverter and the negative potential is supplied via a negative input current terminal of the inverter.

In FIG. 1, the positive rail DC+(corresponding to a positive contact) of the DC transmission terminal is connected to the positive output PA1 of a first H-bridge HB1. Further, the negative rail DC− (corresponding to a negative contact) of the DC transmission terminal is connected to the positive output PA2 of a further H-bridge HB2. An isolator switch T is depicted, which has multiple phases and which isolates the phase windings of the electrical machine EM (or the electrical machine EM itself) from the phase current terminals PA1-3 of the inverter. The isolator switch T therefore controllably isolates the electrical machine EM from the inverter WR. Alternatively, an isolator switch T' inside the electrical machine EM can be used that interrupts the phase windings of the electrical machine EM (for example in star configuration). The isolator switch T' therefore defeats the star configuration of the electrical machine EM when said switch is in the open state. To improve clarity, the isolator switch T' is depicted only as a symbol. If power is transmitted via one of the transmission terminals, then the isolator switch is in the open state.

An AC transmission terminal AC is part of the vehicle electrical system and is configured to have three phases. The AC transmission terminal AC is connected to the phase terminals PS1-3 of the inverter WR. If power is supplied from the AC transmission terminal AC to the vehicle electrical system, then the inverter operates as a converter for converting the AC power into DC voltage for charging the energy store ES. In this mode and in this direction of transmission, the inverter performs the function of a rectifier and possibly the function of a power or current controller or even a voltage regulator.

In FIG. 2, the negative DC transmission terminal DC− is connected to the negative input current terminal EA2, or to a negative rail of the inverter WR. The positive DC transmission terminal DC+ is connected to the phase current terminals PS1-3 of the inverter WR via a switch SW (configured to have multiple phases). If the switch SW is closed (i.e. in the charging mode and possibly in the feedback mode), the phase current terminals PS1-3 are connected to one another and to DC+. Since the phase current terminals PS1-3 are then at the same potential, no current flows inside the electrical machine EM. If the switch SW is open (i.e. in the inverter mode and possibly in the recovery mode), the phase current terminals PS1-3 are isolated from one another and individually connected to the individual phase current terminals PS1-3. The phase current terminals PS1-3 are at different potentials during operation, the differential voltages thereof being consistent with the phase voltages used to excite the electrical machine EM (or generated by the electrical machine EM in the recovery mode).

In FIG. 3, the positive DC transmission terminal DC+ is connected to one end of the phase windings of the electrical machine EM, while the opposite ends of the phase windings of the electrical machine EM are each connected to the phase current terminals PS1-3. Those ends of the phase windings of the electrical machine EM that are connected to the positive DC transmission terminal DC+ are connected to one another and form the star point S of the electrical machine EM. The negative DC transmission terminal DC− is connected to the negative input connection of the inverter WR. The negative DC transmission terminal DC− is in particular connected to the negative inputs of the H-bridges HB1-3.

FIGS. 2 and 3 are depicted without an AC transmission terminal. However, the vehicle electrical systems depicted therein can have an AC transmission terminal having one or more phases and connected to one or more (or all) phase current terminals of the inverter WR. To improve clarity, only FIG. 1 shows a control unit CTRL of the inverter. Said control unit actuates the semiconductor switches HS and the bridges HB1-3, as indicated by the double-headed arrows. A superordinate controller can be formed, depending on mode, by a controller UE of the battery in the form of a battery management system, or by a controller UE' that is stationary. The superordinate controller UE or UE' actuates (as indicated by the dashed arrows) the control unit CTRL, in particular by transmitting a setpoint value. The vehicle electrical system can have a reception unit for transmitting signals from stationary components to the control unit CTRL of the vehicle electrical system. The circuits of FIGS. 2 and 3 can also have at least one such controller CTRL, UE or UE'.

The invention claimed is:

1. A vehicle electrical system comprising:
an inverter;
an electrical energy store;
an electrical machine; and
a DC transmission terminal for bidirectional transfer of power between the electrical energy store and a DC charger,
wherein the inverter has a positive input current terminal and a negative input current terminal that are connected to the energy store;
the inverter has at least two phase current terminals connected to the electrical machine; and
the inverter has at least two H-bridges, wherein each of the H-bridges includes four switches, a first pair of the four switches are connected between the two input current terminals that are connected to the energy store, and a second pair of the four switches are connected to a respective one of the at least two phase current terminals, the DC transmission terminal having a positive rail that is connected to at least one of the phase current terminals, the four switches selectively connecting the positive rail of the DC transmission terminal to the positive input current terminal of the inverter for controlling the bidirectional transfer of power between the electrical energy store and the DC charger.

2. The vehicle electrical system as claimed in claim 1, wherein the positive rail is connected to at least one of the phase current terminals directly or is connected to at least one of the phase current terminals indirectly via the electrical machine.

3. The vehicle electrical system as claimed in claim 2, wherein the positive rail is connected to one of the phase current terminals directly, the DC transmission terminal having a negative rail connected to another of the phase current terminals.

4. A vehicle electrical system comprising:
an inverter;
an electrical energy store;
an electrical machine; and
a DC transmission terminal,
wherein the inverter has a positive input current terminal and a negative input current terminal that are connected to the energy store;
the inverter has at least two phase current terminals connected to the electrical machine;
the inverter has at least two H-bridges, wherein each of the H-bridges is connected between the two input current terminals and a respective one of the at least two phase current terminals, the DC transmission terminal having a positive rail connected to at least one of the phase current terminals,
wherein the positive rail is connected to at least one of the phase current terminals directly or is connected to at least one of the phase current terminals indirectly via the electrical machine,
wherein the positive rail is connected to one of the phase current terminals directly, the DC transmission terminal having a negative rail connected to another of the phase current terminals, and
wherein the phase current terminals are connected to the electrical machine via an isolator switch.

5. The vehicle electrical system as claimed in claim 2, wherein the positive rail is connected to the phase current terminals directly or via a switch, the DC transmission terminal having a negative rail connected to the negative input current terminal of the inverter.

6. The vehicle electrical system as claimed in claim 2, wherein the positive rail is connected to the phase current terminals indirectly via the electrical machine.

7. The vehicle electrical system as claimed in claim 6, wherein the DC transmission terminal has a negative rail connected to the negative input current terminal of the inverter.

8. The vehicle electrical system as claimed in claim 6, wherein the electrical machine has a star point and the positive rail is connected to the phase current terminals via the star point.

9. The vehicle electrical system as claimed in claim 1, further comprising an AC transmission terminal connected to at least one of the phase current terminals.

10. The vehicle electrical system as claimed in claim 1, wherein the H-bridges of the inverter each have two arms connecting the positive input current terminal to the negative input current terminal by two series semiconductor switches.

11. The vehicle electrical system as claimed in claim 10, wherein the semiconductor switches of each arm are connected to one another at connecting points and the two connecting points of each H-bridge are connected to one another by an inductance.

12. The vehicle electrical system as claimed in claim 7, wherein the electrical machine has a star point and the positive rail is connected to the phase current terminals via the star point.

\* \* \* \* \*